Dec. 19, 1967  W. B. FREID  3,358,440
FLEXIBLE SUPPORT MEANS FOR GAS TURBINE POWERPLANTS
Filed Dec. 6, 1965  2 Sheets-Sheet 1
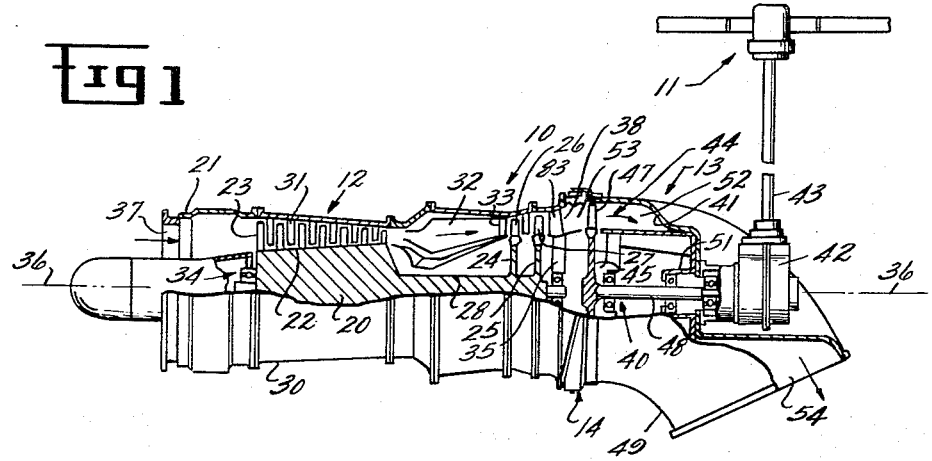
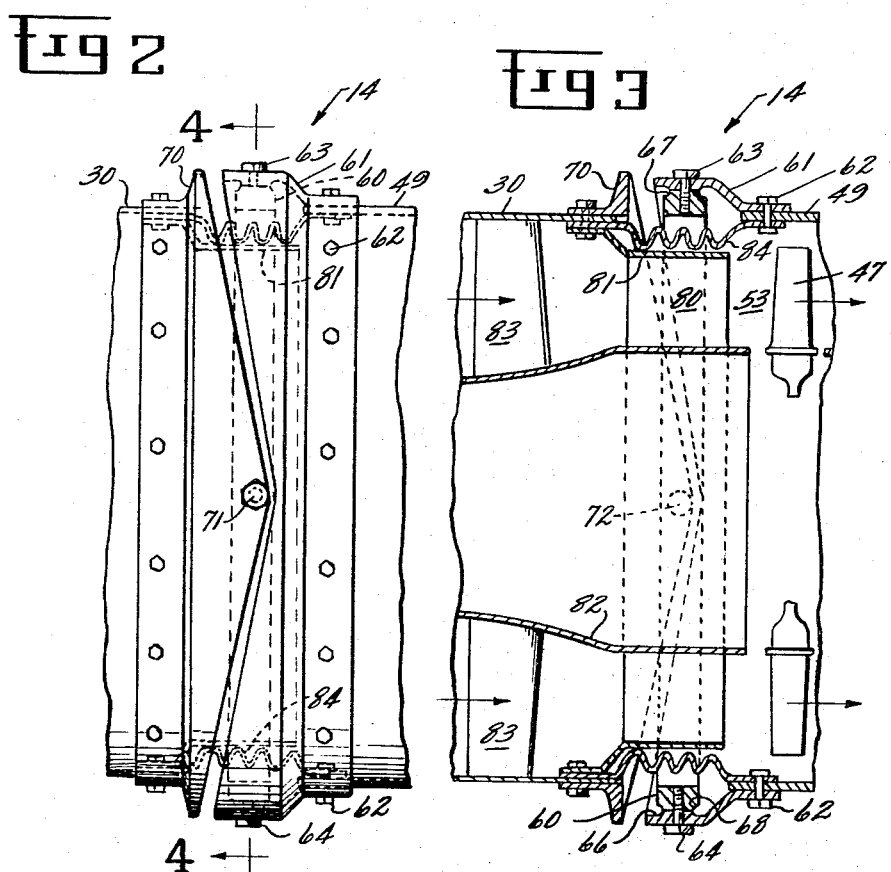
INVENTOR.
WILBERT B. FREID
BY
George R. Powers
ATTORNEY

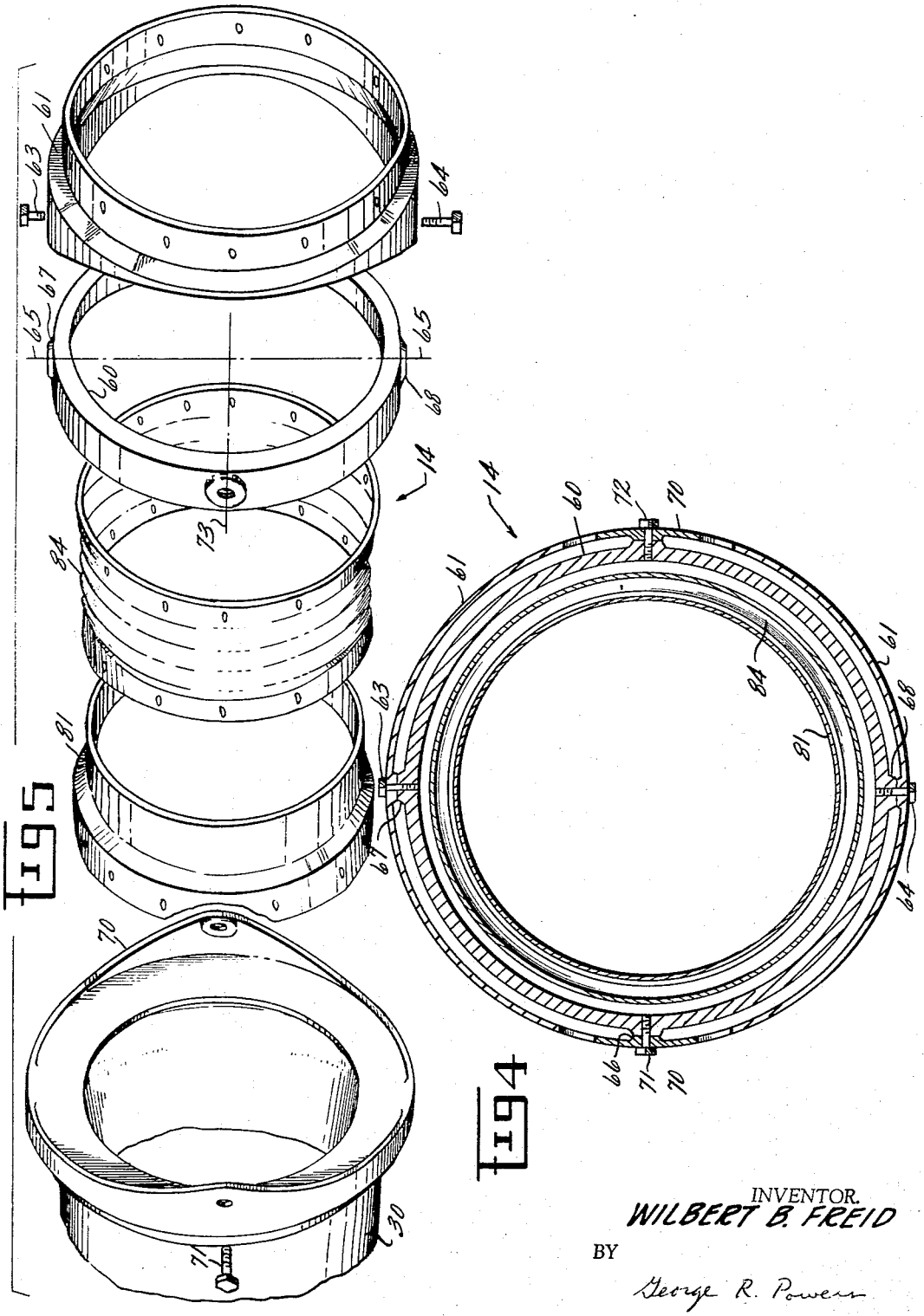

United States Patent Office 3,358,440
Patented Dec. 19, 1967

3,358,440
FLEXIBLE SUPPORT MEANS FOR GAS TURBINE POWERPLANTS
Wilbert Bernard Freid, Swampscott, Mass., assignor to General Electric Company, a corporation of New York
Filed Dec. 6, 1965, Ser. No. 511,698
9 Claims. (Cl. 60—39.16)

ABSTRACT OF THE DISCLOSURE

This disclosure describes means for eliminating output shaft misalignment in gas turbine powerplants in order to prevent vibration and wear. A gas turbine powerplant is comprised of two major components, a gas generating unit 12 and a power unit 13, each having separate substantially rigid stator structure (21, 41) and independent rotor (20, 40). The separate rigid stator structures 21 and 41 of the gas generating and the power units respectively, are interconnected by means that are both flexible and capable of transmitting axial and shear forces therebetween. As illustrated in FIGS. 2-5, the flexible interconnecting means 14 comprises a gimbal and flexible wall arrangement, the gimbal providing both flexibility and force transmitting capability and the flexible wall preventing leakage of motive fluid produced by the gas generating unit and supplied to the power unit. A further aspect of the invention has a driven unit, having a stationary housing, rigidly sequred to and supported by the rigid structure of the power unit. Also the power shaft of the power unit is rigidly connected to the driven unit to transmit power thereto. By this arrangement of parts shaft misalignment is eliminated and vibration and wear resulting therefrom is prevented.

---

This invention relates to means for eliminating output shaft misalignment in gas turbine powerplants and, more particularly, to support means flexibly interconnecting substantially rigid components of gas turbine powerplants of the shaft type.

In a gas turbine powerplant of the shaft type, the hot combustion products drive not only a compressor, but also an external load through an output shaft. Gas turbine engines of the shaft type include "turboprop" engines in which the output shaft drives an aircraft propeller and "turboshaft" engines in which the output shaft drives a load other than a propeller. Both types of shaft engines are widely used in aircraft applications, turboshaft engines being particularly suited for driving helicopter rotor assemblies. When used in this manner, a turboshaft engine is subjected to many of the same design requirements as a turboprop engine. For example, it is generally required that both turboshaft and turboprop engines produce substantial amounts of power in an efficient manner. Moreover, in view of space and weight limitations in aircraft, the engines should be both compact and lightweight. For the most part, engine designers have been quite successful in meeting these criteria. In practice, however, it has been found that misalignment is likely to occur between the output shaft of a turboshaft engine and the driven load, the misalignment occurring for several reasons. First of all, an airframe is not a particularly rigid base upon which to mount an engine and a driven unit. If the engine and the load are separately mounted on the airframe, normal airframe deflections during aircraft operation can cause substantial misalignment between the separate components. Secondly, a lightweight engine structure of the type required for aircraft powerplants is also susceptible to deflections during normal aircraft operation. These deflections can also cause misalignment between the shaft and the load even when the load is secured directly to the engine structure. To accommodate misalignment between the output shaft and the driven load, the usual practice has been to take up the misalignment with suitable mechanical couplings such as flexible couplings, crowned splines, and universal joints. These arrangements are not, however, entirely satisfactory in practice. For example, unless the complete system is carefully balanced after the powerplant and the load are joined, these mechanical couplings can exhibit vibration of significant magnitude during high speed operation. If sufficiently severe, these vibrations can cause extremely high stresses in the various powerplant elements and can ultimately cause fatigue failure. Furthermore, mechanical couplings of these types are subject to extremely rapid wear even under ideal vibration conditions since such assemblies often operate at speeds up to and even exceeding 20,000 r.p.m.

It is therefore an object of this invention to provide novel means for substantially preventing misalignment between the output shaft of a gas turbine powerplant and a driven load.

Another object of this invention is to provide in aircraft power plant arrangements means for preventing vibration and wear due to output shaft misalignment.

A further object of this invention is to eliminate the necessity of utilizing mechanical couplings in aircraft gas turbine powerplants of the shaft type for the purpose of accommodating output shaft misalignment.

Briefly stated, in carrying out the invention in one form, a gas turbine powerplant is comprised of two major components, a gas generating unit and a power unit each having a separate substantially rigid stator structure and an independent rotor. More particularly, the rotor of the gas generating unit includes a compressor and a turbine interconnected and rotatably mounted in its rigid stator structure, and the rotor of the power unit includes a power turbine and a power shaft integral therewith rotatably mounted in the rigid stator structure of the power unit. The separate, rigid stator structures of the gas generating and power units are flexibly interconnected by means capable of transmitting axial and shear forces therebetween. By one aspect of the invention, the flexible interconnecting means comprises a gimbal and flexible wall arrangement, the gimbal providing both flexibility and force transmitting capability and the flexible wall or bellows preventing leakage of motive fluid produced by the gas generating unit and supplied to the power unit.

By a further aspect of the invention, a driven unit having a stationary housing is rigidly secured to and supported by the rigid stator structure of the power unit, the power shaft being rigidly connected to the driven unit to transmit power thereto. In accordance with the present invention, flexible or similar coupling means are not required between the power shaft and the driven unit since misalignment and deflections are taken by the stationary flexible means between the stators of the gas generating and power units rather than in the driving means between the power turbine and the driven unit. Since misalignment is accommodated by stator members rather than rotor elements, vibration and wear in the driving means are substantially less than would otherwise be experienced.

While the invention is distinctly claimed and particularly pointed out in the claims appended hereto, the invention, both as to organization and content, will be better understood and appreciated, along with other objects and features thereof, from the following detailed description when taken in conjunction with the drawings, in which:

FIG. 1 is a view partially in cross section of a turboshaft engine incorporating the present invention;

FIG. 2 is an enlarged view of the gimbal and bellows connecting arrangement of this invention;

FIG. 3 is a view similar to FIG. 2 showing the gimbal and bellows arrangement in cross section;

FIG. 4 is a view taken along viewing line 4—4 of FIG. 2; and

FIG. 5 is an exploded, pictorial view of the gimbal and bellows arrangement of this invention.

Referring first to FIG. 1, a gas turbine powerplant 10 of the shaft type is illustrated. More particularly, the illustrated powerplant 10 is a turboshaft engine driving a helicopter rotor assembly 11. The turboshaft engine includes a gas generating unit 12, a power unit 13, and means 14 flexibly interconnecting the gas generating and the power units. Before describing the novel manner in which the units 12 and 13 are interconnected, however, the gas generating unit 12 and the power unit 13 will be discussed in some detail.

With reference to the gas generating unit 12, it will be noted that the unit comprises two major subassemblies, a rotor 20 and a rigid stator 21. The rotor 20 includes an axial flow compressor drum 22 and compressor blades 23 mounted thereon, turbine discs 24 and 25 having circumferential rows of turbine buckets 26 and 27, respectively, mounted thereon, and a shaft 28 interconnecting the turbine discs and the compressor drum. The stator structure 21 includes a generally cylindrical casing 30, compressor stator vanes 31, a combustor 32, turbine nozzle vanes 33, and support means 34 and 35 at opposite ends of the casing 30 for supporting the rotor 20 for rotation about an axis of rotation 36. The rotor 20 and the rigid stator 21 cooperate to form an annular motive fluid passageway extending axially between an annular inlet 37 adjacent support means 34 and an annular outlet 38 adjacent support means 35.

The power unit 13 is comprised of three major subassemblies, a rotor 40, a rigid stator 41, and a gearbox having a stationary housing 42 rigidly secured directly to the stator structure 41. An output shaft 43 from the gearbox, or driven unit, drives the helicopter rotor assembly 11. The rotor 40 includes a power turbine 44 comprised of a turbine disc 45 and a circumferential row of turbine buckets 47 peripherally mounted thereon and a power shaft 48 integrally formed with the disc 45 and projecting downstream from the power turbine 44. The rigid stator structure 41 includes a casing 49 and support means 50 and 51 supporting the rotor 40 for rotation about the axis of rotation 36. The rotor 40 and the rigid stator structure 41 cooperate to form a motive fluid passageway 52 having an annular inlet 53 and an outlet 54, the annular inlet 53 being aligned with the annular outlet 38 for receiving therefrom hot gas generated by the gas generating unit 12. The hot combustion products flow through the inlet 53 to drive the power turbine 44 and, therefore, the helicopter rotor assembly 11.

In accordance with the present invention, the power shaft 48 is rigidly connected to the driven unit without the use of a flexible or similar coupling. This can be done since deflections and misalignments normally transmitted through the rotating drive means in prior art arrangements are taken up in the practice of the present invention by the flexible means 14 interconnecting the gas generating and power units 12 and 13, respectively. By accommodating deflections and misalignments in a static rather than a rotating element, the vibration and wear difficulties which have been common heretofore are largely eliminated. The flexible means 14 is, however, more than just a flexible device; it not only accommodates normal deflections and misalignments experienced during powerplant operation, but also transmits axial and shear forces between the gas generating and power units. Accordingly, the complete powerplant 10 can be treated for mounting purposes as a single entity rather than as independent components.

With reference now to FIGS. 2-5, the flexible means 14, which is basically a gimbal and bellow arrangement, will be described. As shown, the assembly includes a gimbal ring 60 axially interposed between the downstream end of the casing 30 of the gas generating unit 12 and the upstream end of the casing 49 of the power unit 13. A rigid flange member 61 is secured to the upstream end of the casing 49 by fasteners 62, the flange member 61 extending upstream therefrom and being pivotally connected to the gimbal ring 60 by pins 63 and 64. The pins 63 and 64, which are in the illustrated embodiment bolts passing through openings in the flange member 61 and screwed into the gimbal ring 60, provide for relative movement on an axis 65 coinciding with a first diameter of the gimbal ring 60. This relative movement is permitted by making the inner surface 66 of the flange member 61 of somewhat greater diameter than that of the outer surface of the gimbal ring, bosses 67 and 68 being provided at the pin locations to assure a snug fit between the elements. Similarly, a flange member 70 secured to and extending downstream from the downstream end of the casing 30 is pivotally connected to the gimbal ring 60 by pins 71 and 72 on an axis 73 coinciding with a second diameter of the gimbal ring 60, the first and second diameters being mutually perpendicular. To further permit the pivotal motion, each of the flange members 61 and 70 is cut away in the regions in which the other member is connected to the gimbal ring 60.

From the foregoing, it will be appreciated that axial forces can be transmitted between the gas generating and power units 12 and 13, respectively, through the gimbal arrangement since such forces are normal to the plane in which the pins 63, 64, 71, and 72 are located. It may not, however, be quite as clear that shear forces are also transmitted through the gimbal arrangement since such forces are substantially in the same plane as the pins. Since the pins 63, 64, 71, and 72 are disposed about the gimbal ring 60 in 90° intervals, a shear force acting along the axis of one pair of pins will of course be taken in shear by the other set of pins. A shear load not acting along the axis of either set of pins would be sheared by the four pins. Accordingly, the gimbal arrangement can flex to accommodate deflections while at the same time serving as a structural support member between the gas generating and power units. When designing an actual powerplant structure incorporating the present invention, the designer must, of course, size the various elements, including the pins, to carry the anticipated loads.

The flexible means 14 of this invention connects the gas generating and power units 12 and 13, respectively, aerodynamically as well as structurally. In this manner, the flexible means 14 forms a closed conduit 80 between the annular outlet 38 of the gas generating unit 12 and the annular inlet 53 of the power unit 13. This annular conduit 80 is formed between an annular ring 81 secured to the downstream end of the casing 30 and extending downstream therefrom inwardly of the flange member 70 and the gimbal ring 60 and an annular ring 82 extending axially downstream from the radially inner end of exit stator vanes 83 of the gas generating unit 12. These rings 81 and 82 extend into proximity to the turbine buckets 47 to supply motive fluid thereto. Since, however, the downstream ends of these rings 81 and 82 are unsecured, they introduce no restraint into the flexible means. To prevent leakage from the conduit 80, an axially expansible, generally cylindrical bellows 84 is positioned between the outer ring 81 and the gimbal ring 60, the bellows 83 being secured at its ends to the casings 30 and 49 to form a fluid-tight seal. The flexible wall of the bellows 83 introduces very little restraint between the gas generating unit 12 and the power unit 13, but prevents leakage under all conditions of deflection.

From the foregoing, it will be seen that the present invention eliminates the need for mechanical couplings such as flexible couplings between the power turbine and the driven load of a turboshaft engine by transferring deflections and misalignments to static rather than rotating elements. Accordingly, vibration and wear in the driving elements of the gas turbine power plant may be substantially reduced.

It will be understood that the invention is not limited to the specific details of construction and arrangement of the embodiment illustrated and described herein since changes and modifications will be obvious to those skilled in the art. For example, the flange members 61 and 70 may be modified in various manners to connect to mounting flanges of a wide range of pre-existing engine designs, thereby requiring no changes in the preexisting engines. It is therefore intended to cover in the appended claims all such changes and modifications which may occurs to those skilled in the art without departing from the true spirit and scope of the invention.

What is claimed as new and is desired to secure by Letters Patent of the United States is:

1. A gas turbine powerplant assembly comprising:
a gas generating unit including a first rigid stator structure and a first rotor supported by said stator structure for rotation about a first axis of rotation,
a power unit including a second rigid stator structure and a second rotor supported by said second stator structure for rotation about a second axis of rotation,
said gas generating unit and said power unit being in spaced relationship,
and means flexibly interconnecting said first and second rigid stator structures,
said flexible means transmitting forces between said gas generating unit and said power unit,
said first and second axes of rotation are coaxial and said gas generating unit and said power unit are axially spaced relative to said axes of rotation, said flexible means transmitting axial and shear forces between said gas generating unit and said power unit.

2. A gas turbine powerplant assembly as defined by claim 1 in which said flexible means includes flexible wall means interconnecting said first and second rigid stator structures to form a closed conduit therebetween for supplying motive fluid produced by said gas generating unit to said power unit.

3. A gas turbine powerplant as defined by claim 1 in which said flexible means includes:
a gimbal ring between said gas generating unit and said power unit, said gimbal ring having an axis coaxial with said axes of rotation,
means pivotally connecting said first rigid stator structure to said gimbal ring on an axis coinciding with a first diameter of said gimbal ring,
and means pivotally connecting said second rigid stator structure to said gimbal ring on an axis coinciding with a second diameter of said gimbal ring,
said first and second diameters being mutually perpendicular.

4. A gas turbine powerplant as defined by claim 1 in which said power unit comprises:
said second rotor comprising a power turbine and a power shaft integral therewith,
a driven unit having a stationary housing rigidly secured to said second rigid stator structure,
and means rigidly connecting said power shaft to said driven unit to transmit power thereto from said power turbine.

5. A gas turbine powerplant assembly as defined by claim 4 in which said flexible means includes flexible wall means interconnecting said first and second rigid stator structures to form a closed conduit therebetween for supplying motive fluid produced by said gas generating unit to said power unit and said power turbine to drive said driven unit.

6. A gas turbine powerplant assembly as defined by claim 5 in which said flexible means further includes:
a gimbal ring between said gas generating unit and said power unit, said gimbal ring having an axis coaxial with said axes of rotation,
means pivotally connecting said first rigid stator structure to said gimbal ring on an axis coinciding with a first diameter of said gimbal ring,
and means pivotally connecting said second rigid stator structure to said gimbal ring on an axis coinciding with a second diameter of said gimbal ring,
said first and second diameters being mutually perpendicular.

7. A gas turbine powerplant assembly as defined by claim 6 in which said gimbal ring and said pivotal means associated therewith are located radially outward of said flexible wail means.

8. A gas turbine powerplant assembly as defined by claim 4 in which said first rigid stator structure and said first rotor cooperate to form a first motive fluid passageway having an inlet and an annular outlet and in which said second rigid stator structure and said second rotor cooperate to form a second motive fluid passageway having an annular inlet and an outlet, said annular outlet of said first passageway and said annular inlet of said second passageway being in alignment for flow of motive fluid from said gas generating unit to said power unit and said power turbine to drive said driven unit.

9. A gas turbine powerplant as defined by claim 8 in which said flexible means comprises:
a substantially cylindrical, axially expansible wall member interconnecting said first and second rigid stator structures radially outward of said first and second passageways to prevent leakage of motive fluid from said passageways,
a gimbal ring between said gas generating unit and said power unit, said gimbal ring being located radially outward of said wall member and having an axis coaxial with said axis of rotation,
means pivotally connecting said first rigid stator structure to said gimbal ring on an axis coinciding with a first diameter of said gimbal ring,
and means pivotally connecting said second rigid stator structure to said gimbal ring on an axis coinciding with a second diameter of said gimbal ring,
said first and second diameters being mutually perpendicular.

References Cited
UNITED STATES PATENTS

| | | | |
|---|---|---|---|
| 2,972,230 | 2/1961 | Conklin et al. | 60—39.31 |
| 3,077,074 | 2/1963 | Collman et al. | 60—39.31 |
| 3,112,129 | 11/1963 | Willis et al. | 285—226 |
| 3,169,747 | 2/1965 | Harris | 253—39 |

FOREIGN PATENTS 627,120  7/1949  Great Britain.

JULIUS E. WEST, *Primary Examiner.*